United States Patent

Hara et al.

[11] Patent Number: 5,714,524
[45] Date of Patent: Feb. 3, 1998

[54] PHOTOCURABLE SILICONE COMPOSITION

[75] Inventors: Osamu Hara, Tsukui-gun; Kunihiko Nakashima, Machida, both of Japan

[73] Assignee: Three Bond Co., Ltd., Tokyo, Japan

[21] Appl. No.: 751,252

[22] Filed: Nov. 18, 1996

Related U.S. Application Data

[63] Continuation of Ser. No. 561,116, Nov. 20, 1995, abandoned, which is a continuation of Ser. No. 227,289, Apr. 13, 1994, abandoned.

[51] Int. Cl.$^6$ .................................................. C08G 77/00
[52] U.S. Cl. .......................... 522/99; 556/425; 528/38; 528/28; 528/26
[58] Field of Search .................... 528/38, 26, 28; 556/425; 522/99

[56] References Cited

U.S. PATENT DOCUMENTS

| | | | |
|---|---|---|---|
| 3,045,036 | 7/1962 | Jex et al. | 260/448.2 |
| 3,169,942 | 2/1965 | Pike | 556/425 |
| 3,249,535 | 5/1966 | Keil | 556/425 |
| 3,890,269 | 6/1975 | Martin | 528/14 |
| 4,563,539 | 1/1986 | Gornowicz et al. | 556/421 |
| 4,606,933 | 8/1986 | Griswold et al. | 427/54.1 |
| 4,608,270 | 8/1986 | Varaprath | 427/35 |
| 4,911,852 | 3/1990 | Coffindaffer et al. | 252/8.8 |
| 5,378,734 | 1/1995 | Inoue | 522/11 |

FOREIGN PATENT DOCUMENTS 64-14226  1/1989  Japan.

*Primary Examiner*—Margaret W. Glass
*Attorney, Agent, or Firm*—Scully, Scott, Murphy & Presser

[57] ABSTRACT

A photocurable silicone composition easy to manufacture, free of variations in adhesion and effective as a potting material or the like is provided. The composition is prepared by adding a silanol terminated organosiloxane to an amino group-containing organodialkoxysilane, then reacting the resulting amino group-containing organopolysiloxane with a vinyl group-containing isocyanate, acrylic anhydride, methacrylic anhydride, acrylic halide or methacrylic halide and combining the resulting photocurable organopolysiloxane with a photopolymerization catalyst.

4 Claims, No Drawings

PHOTOCURABLE SILICONE COMPOSITION

This is a continuation of application No. 08/561,116, filed Nov. 20, 1995, now abandoned, which is a continuation of 08/227,289 filed Apr. 13, 1994, now abandoned.

BACKGROUND OF THE INVENTION

The present invention relates to a photocurable silicone composition useful as a potting material or an adhesive.

Silicone gel has a low elastic modulus and a strong bonding force, so it is in wide use as a potting material for hybrid IC as well as a potting material or an adhesive in the production of various electronic parts. Heretofore, the silicone gel has been prepared by an addition reaction involving reaction of an unsaturated group bonded to silicon atom with hydrogen atom bonded to silicon atom in the presence of a platinum catalyst. However, such an addition reaction requires a curing temperature of 80° to 150° C., and the platinum catalyst is apt to undergo curing inhibition. In view of these problems there has also been proposed an ultraviolet curing type silicone gel. For example, in Japanese Patent Laid Open No. JP64-14226A there is disclosed an organosiloxane having an acrylate or methacrylate group at one end. However, the production of this organosiloxane involves many manufacturing steps and the cost thereof is high, so that the utility thereof is low and the organosiloxane obtained is expensive as a potting material. Besides, it is difficult to control acryl group to be attached to the silicone chain, thus causing variations in the resulting adhesion. Further, in the case of an acrylofunctional silicone which is disclosed in Japanese Patent Laid Open No. JP61-145227A, its cured product is too hard for use as a potting material, an adhesive or the like though it is suitable for coating or the like.

It is the object of the present invention to solve the above-mentioned problems of the prior art.

SUMMARY OF THE INVENTION

The photocurable silicone composition of the present invention comprises a photocurable organopolysiloxane and a photopolymerization catalyst, the photocurable organopolysiloxane being prepared by reacting an amino group-containing organopolysiloxane with a vinyl group-containing isocyanate, acrylic anhydride, methacrylic anhydride, acrylic halide or methacrylic halide, the amino group-containing organopolysiloxane being prepared by adding a silanol terminated organopolysiloxane to an amino group-containing organodialkoxysilane.

DETAILED DESCRIPTION OF THE INVENTION

In the present invention, acryl and methacryl are generically termed (meth)acryl hereinunder.

The photocurable organopolysiloxane which is a main essential ingredient in the composition of the present invention is prepared by adding a silanol terminated organopolysiloxane to an amino group-containing organodialkoxysilane to prepare an amino group containing organopolysiloxane and then reacting the amino group organopolysiloxane with an isocyanate compound having at least one vinyl group as a photocurable functional group for the addition of amino group and isocyanate group or with (meth)acrylic anhydride or (meth)acrylic halide for the addition of (meth)acryloyl group to the amino group.

The above reaction proceeds extremely easily and quantitatively without the need of using any catalyst.

The reaction components can each be selected suitably from among compounds known in this field. Typical examples of the amino group-containing organodialkoxysilane are those represented by the following

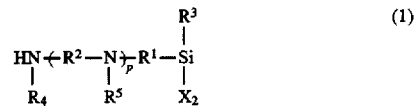

wherein $R^1$ and $R^2$ are each a divalent hydrocarbon group, preferably an alkylene group having 1 to 4 carbon atoms or an arylene group such as phenylene, $R^3$ is a monovalent hydrocarbon group, preferably an alkyl group having 1 to 4 carbon atoms or an aryl group, $R^4$ is hydrogen or a monovalent hydrocarbon group, preferably an alkyl group such as methyl, an aralkyl group such as benzyl or a substituted alkyl group such as $—C_3H_6—Si(OCH_3)_3$, $—C_2H_4—COOCH_3$ or

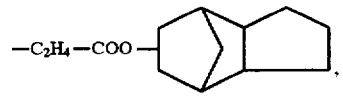

$R^5$ is hydrogen or a monovalent hydrocarbon group or substituted hydrocarbon group, preferably allyl, alkyl or dialkoxysilylalkyl, X is an alkoxy group and p is an integer of 0 to 4. More concrete examples are (β-aminoethyl)-β-aminoethylmethyldialkoxysilane, (β-aminoethyl)-γ-aminopropylmethyldialkoxysilane, (γ-aminopropyl)-β-aminoethylmethyldialkoxysilane, (γ-aminopropyl)-γ-aminopropylmethyldialkoxysilane, aminopropylmethyldialkoxysilane, 3-[N-allyl-N(2-aminoethyl)] aminopropylmethyldimethoxysilane, and aminosilane compounds represented by the following formulae:

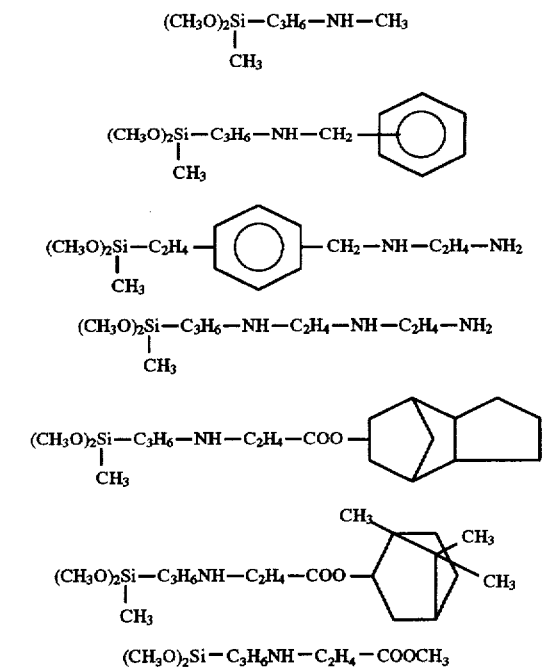

Typical examples of the silanol terminated organosiloxane are those represented by the following general formula:

wherein $R^6$ is a monovalent hydrocarbon group, preferably an alkyl group having 1 to 4 carbon atoms, an alkene group such as vinyl or allyl or an aryl group such as phenyl, and m is an integer of 50 to 10,000.

By reacting the components of the above general formulae (1) and (2) there typically is obtained an end amino group-containing organosiloxane represented by the following general formula:

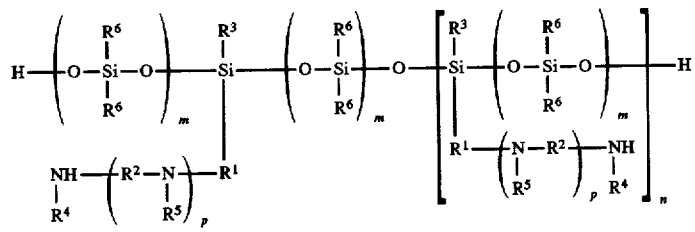

wherein n is an integer of 0 to 100. As to the ratio of both components, it is preferred that the component (2) be used in an amount (n+2) mol, preferably (n+1) mol, per (n+1) mol of the component (1).

As examples of the vinyl group-containing isocyanate there are mentioned methacryloyl isocyanate, 2-isocyanatoethyl methacrylate, isopropenyl-2,2-dimethylbenzyl isocyanate, and isocyanate group-containing (meth)acrylates obtained by the reaction of polyisocyanate compounds having two or more isocyanate groups such as 2,4-tolylene diisocyanate, 2,6-tolylene diisocyanate and 1,5-naphthalene diisocyanate with hydroxyl group-containing (meth)acrylates such as 2-hydroxyethyl methacrylate and 2-hydroxypropyl methacrylate. In place of these isocyanate compounds there may be used (meth) acrylic anhydride or (meth)acrylic halides, e.g. acrylic chloride ($CH_2$=CHCOCl).

This reaction proceeds easily by mixing 1 mol of the amino group-containing organosiloxane of the general formula (3) with at least 1 mol, preferably 1 to 1.5 mols, of a vinyl group-containing isocyanate under heating at a temperature of 50° C. or so.

As the photopolymerization catalyst there may be used a known photopolymerization catalyst. Examples are acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-methylbenzophenone, 4-chloro-4-benzylbenzophenone, 3-chloroxanthone, 3,9-dichloroxanthone, 3-chloro-8-nonylxanthone, benzoylmethyl ether, benzoylbutyl ether, bis(4-dimethylaminophenyl)ketone, benzyl methoxy ketal and 2-chlorothioxanthone. As to the amount of the photopolymerization catalyst to be used, an amount thereof which permits the polymerization system to be rendered slightly sensitive to light will do. More specifically, its amount is in the range of 0.01 to 10 wt %, preferably 0.1 to 5 wt %, based on the total weight of oligomers present in the composition.

Although the composition of the present invention basically comprises the components described above, there may be used various additives as necessary. Particularly, the use of fumed silica is preferred because it leads to the improvement in physical properties of a cured product obtained from the composition. It is also possible to effect wet curing by the utilization of end silanol, or in the case where the end silanol poses some problem, there may be used triethylchlorosilane for example to eliminate activity.

As a radical polymerization initiator there may be used not only a photopolymerization initiator but also a thermopolymerization initiator or a redox polymerization initiator, thereby allowing thermal polymerization or redox polymerization to take place. Further, for the adjustment of viscosity there may be added dimethyl silicone oil or a reactive diluent.

Production Example 1

16.3 g of aminopropylmethyldimethoxysilane was added to 2,000 g of silanol terminated polydimethylsiloxane (molecular weight: 10,000) and reaction was allowed to take place with stirring in a nitrogen atmosphere at 100° C. for 2 hours, followed by evacuation to remove excess aminopropylmethyldimethoxysilane, affording polydimethylsiloxane having an amino group and having a viscosity of 10,000 cPs.

Production Example 2

7.4 g of aminoethylaminopropylmethyldimethoxysilane was added to 3,000 g of silanol terminated polydimethylsiloxane (molecular weight: 30,000) and reaction was allowed to take place with stirring in a nitrogen atmosphere at 100° C. for 2 hours, followed by evacuation to remove excess aminoethylaminopropylmethyldimethoxysilane, affording polydimethylsiloxane having an amino group and having a viscosity of 14,500 cPs.

EXAMPLES

Example 1

0.77 g of 2-isocyanatoethyl methacrylate was added to 100 g of the resin obtained in Production Example 1 and reaction was allowed to take place with stirring in a nitrogen atmosphere at 50° C. for 1 hour. Further, 0.5 g of 1-hydroxycyclohexyl phenyl ketone was added as a photocuring catalyst to afford an ultraviolet-curing silicone composition.

Example 2

0.55 g of methacrylate was added to 100 g of the resin obtained in Production Example 1 and reaction was allowed to take place with stirring at room temperature in a nitrogen atmosphere for 1 hour. Further, 40 g of dimethyl silicone oil having a viscosity of 100 cPs and 0.5 g of dimethoxyacetophenone as a photocuring catalyst were added to afford an ultraviolet-curing silicone composition.

Example 3

0.17 g of methacrylic acid anhydride was added to 100 g of the resin obtained in Production Example 2 and reaction was allowed to take place with stirring at room temperature in a nitrogen atmosphere for 1 hour. Further, 0.5 g of 1-hydroxycyclohexyl phenyl ketone was added as a photocuring catalyst to afford an ultraviolet-curing silicone composition.

Example 4

0.10 g of acrylic acid chloride was added to 100 g of the resin obtained in Production Example 2 and reaction was allowed to take place with stirring in a nitrogen atmosphere at 50° C. for 1 hour. Further, 40 g of dimethyl silicone oil having a viscosity of 100 cPs and 0.5 g of dimethoxyacetophenone as a photocuring catalyst were added to afford an ultraviolet-curing silicone composition.

Comparative Example 1

35.9 g of aminopropyltrimethoxysilane was added to 1,000 g of silanol terminated polydimethylsiloxane (molecular weight: 10,000) and reaction was allowed to take place with stirring in a nitrogen atmosphere at 100° C. for 2 hours, followed by evacuation to remove excess aminopropyltrimethoxysilane, affording polydimethylsiloxane having amino groups at both ends and having a viscosity of 5,000 cPs.

3.0 g of 2-isocyanatoethyl methacrylate was added to 100 g of this resin and reaction was allowed to proceed with stirring in a nitrogen atmosphere at 50° C. for 1 hour. Further, 1 g of 1-hydroxycyclohexyl phenyl ketone was added as a photocuring catalyst to afford an ultraviolet-curing silicone composition.

The resin compositions obtained in the above Examples and Comparative Example were each charged into a container at a volume of 20 mm deep by 20 mm in diameter and then irradiated at 150 mW/cm$^2$ for 20 seconds using a high-pressure mercury vapor lamp of 4 kW. The resulting cured products, which were gel-like, were measured for penetration.

The results obtained are as shown in Table 1 below.

TABLE 1

| Example | 1 | 2 | 3 | 4 | Comparative Example 1 |
|---|---|---|---|---|---|
| Blank | | | | | |
| Penetration | 100 | 120 | 200 | 200 | 20 (JIS-A) |
| Adhesion*[1] | O | O | O | O | X |
| Cured Thickness (mm) | 20 | 20 | 20 | 20 | 10 |

*[1] checked by touch
O adherent
X not adherent

What is claimed is:

1. A photocurable silicone composition useful as an adhesive and as a potting material comprising a photocurable organopolysiloxane and a photopolymerization catalyst, said photocurable organopolysiloxane prepared by reacting an amino group-containing organopolysiloxane with a vinyl group-containing isocyanate, acrylic anhydride, methacrylic anhydride, acrylic halide or methacrylic halide, said amino group-containing organopolysiloxane having the structural

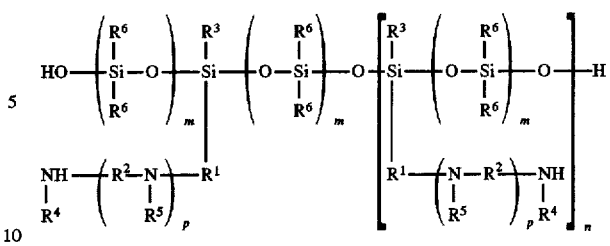

where $R^1$ and $R^2$ are each a divalent hydrocarbon group; $R^3$ is a monovalent hydrocarbon group; $R^4$ is hydrogen, a monovalent hydrocarbon group or a substituted alkyl group; $R^5$ is hydrogen, a monovalent hydrocarbon group or a dialkoxysilyl-substituted monovalent hydrocarbon group; $R^6$ is a monovalent hydrocarbon group; m is an integer of 50 to 10,000; n is an integer of zero to 100; and p is an integer of zero to 4, prepared by adding a silanol terminated organopolysiloxane to an amine group-containing organoalkoxysilane.

2. A silicone composition as set forth in claim 1, wherein said vinyl group-containing isocyanate is methacryloyl isocyanate, 2-isocyanatoethyl methacrylate, isopropenyl-2, 2-dimethylbenzyl isocyanate or an isocyanate group-containing (meth)acrylate obtained by the reaction of a polyisocyanate compound having two or more isocyanate groups with a (meth)acrylate having a hydroxyl group.

3. A silicone composition as set forth in claim 1 wherein said silanol terminated organosiloxane is a compound having the formula

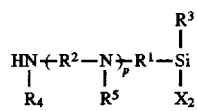

where $R^6$ and m have the meanings of said organopolysiloxane; and said amino group-containing organoalkoxysilane is a compound having the formula

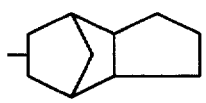

where $R^1$; $R^2$; $R^3$; $R^4$ $R^5$; and p have the meanings of said organopolysiloxane; and X is an alkoxy group.

4. A silicone composition as set forth in claim 3 wherein $R^1$ and $R^2$ are each an alkylene group having 1 to 4 carbon atoms or an arylene group; $R^3$ is an alkyl group having 1 to 4 carbon atoms or an aryl group; $R^4$ is hydrogen, an alkyl group, an aralkyl group, —C$_3$H$_6$—Si(OCH$_3$)$_3$, —C$_2$H$_4$—COOCH$_3$ or —C$_2$H$_4$—COO—

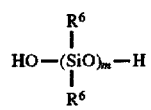

$R^5$ is hydrogen, allyl, alkyl or dialkoxysilylalkyl; $R^6$ is an alkyl group having 1 to 4 carbon atoms, a vinyl group, an allyl group or an aryl group; and n is 0 or 1.

* * * * *

UNITED STATES PATENT AND TRADEMARK OFFICE
CERTIFICATE OF CORRECTION

PATENT NO. : 5,714,524

DATED : February 3, 1998

INVENTOR(S) : Osamu Hara

It is certified that error appears in the above-identified patent and that said Letters Patent is hereby corrected as shown below:

Column 2, line 2: "catalyst," should read --catalyst.--

Column 2, line 17: "Or" should read --or--

Column 5, line 25: "5,000 should read --15,000--

Signed and Sealed this

Twenty-seventh Day of June, 2000

Attest:

Q. TODD DICKINSON

*Attesting Officer*  *Director of Patents and Trademarks*